US009811072B2

(12) United States Patent
Hermans et al.

(10) Patent No.: US 9,811,072 B2
(45) Date of Patent: Nov. 7, 2017

(54) APPARATUS AND METHOD FOR ANALYZING A CONTROL NETWORK (71) Applicant: ROCKWELL AUTOMATION TECHNOLOGIES, INC., Mayfield Heights, OH (US)

(72) Inventors: Matthew A Hermans, Saukville, WI (US); Joseph Zaccaria, Brookfield, WI (US); Raymond Spangler, Bakerfield, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 240 days.

(21) Appl. No.: 14/510,797

(22) Filed: Oct. 9, 2014

(65) Prior Publication Data

US 2016/0105337 A1  Apr. 14, 2016

(51) Int. Cl.
*G05B 19/05* (2006.01)
*G05B 19/418* (2006.01)
*H04L 12/24* (2006.01)

(52) U.S. Cl.
CPC ......... *G05B 19/05* (2013.01); *G05B 19/4186* (2013.01); *H04L 41/085* (2013.01); *Y02P 90/185* (2015.11)

(58) Field of Classification Search
CPC ....... H04L 41/085; H04L 43/08; H04L 67/02; G05B 19/4186; G05B 19/05
See application file for complete search history.

(56) References Cited

U.S. PATENT DOCUMENTS

| 5,452,201 | A | 9/1995 | Pieronek et al. |
| 7,596,095 | B2 | 9/2009 | Chen et al. |
| 7,725,528 | B1 * | 5/2010 | Zink ............... G05B 19/054 709/203 |
| 8,156,232 | B2 * | 4/2012 | Callaghan ........... G05B 19/05 700/83 |

(Continued)

FOREIGN PATENT DOCUMENTS

EP  3007386 A1  4/2016
WO  2013184117 A1  12/2013

OTHER PUBLICATIONS

Rockwell Automation; System Ferret; Website; www.rockwellautomation.com/solutions/integratedarchitecture/resources4; 2012; US.

(Continued)

*Primary Examiner* — Sargon Nano
*Assistant Examiner* — Kidest Mendaye
(74) *Attorney, Agent, or Firm* — Boyle Fredrickson, SC (57) ABSTRACT

Aspects of the present invention provide isolating and applying a common protocol which may be used by multiple devices across multiple network levels to analyze an entire system of control networks. A generic message may be sent individually to targeted addresses across a network level. If a response is received from a device at a targeted address, such as within a timeout period, a specific message customized to the individual device may be sent to extract further detail about the device, including its connectivity to other devices and networks. The system may continue automatically until resource utilization of the entire system is determined to thereby provide diagnostic and reliability services.

15 Claims, 5 Drawing Sheets

(56) References Cited

U.S. PATENT DOCUMENTS

| | | | |
|---|---|---|---|
| 2003/0236860 A1* | 12/2003 | Yegin | H04W 4/02 709/218 |
| 2007/0058929 A1* | 3/2007 | Chaffee | G05B 19/0423 386/316 |
| 2007/0061018 A1* | 3/2007 | Callaghan | G05B 19/05 700/1 |
| 2007/0073850 A1 | 3/2007 | Callaghan et al. | |
| 2007/0168571 A1* | 7/2007 | Ramsey | G06F 8/65 710/8 |
| 2007/0186011 A1* | 8/2007 | Batke | H04L 41/0213 709/246 |
| 2007/0237141 A1* | 10/2007 | Marchese | H04L 41/0853 370/389 |
| 2009/0037872 A1* | 2/2009 | Schnabele | G05B 19/4183 717/105 |
| 2009/0222541 A1 | 9/2009 | Monga et al. | |
| 2010/0298955 A1* | 11/2010 | Grgic | G06F 11/1451 700/3 |
| 2011/0060427 A1* | 3/2011 | Batke | G05B 23/0267 700/79 |
| 2012/0250544 A1* | 10/2012 | Sasaki | G05B 19/4184 370/252 |
| 2013/0212574 A1 | 8/2013 | Hutchinson et al. | |
| 2013/0345829 A1 | 12/2013 | Garg | |
| 2015/0156285 A1* | 6/2015 | Blair | H04L 12/4633 709/201 |

OTHER PUBLICATIONS

Rockwell Automation; "The Common Industrial Protocol (CIP) and the Family of CIP Networks; Publication;" Copyright 2006, Open DeviceNet Vendor Association, Inc.; p. 1-84; US.

Rockwell Automation Publication; "Logix5000 controllers Add-On Instructions,"; Programming Manual; 1756-PM010E-EN-P, Sep. 2012; p. 1-98; US.

Extended European Search Report; Application No. 15188089.5.

EP Search Report tor Application No. 15 188 089.5: dated Feb. 3, 2017.

Sematech; "Failure Reporting, Analysis and Corrective Action System"; 1993; p. 1-14.

Extended European Search Report dated Jun. 20, 2017; Application No. 17150084.6—(12) pages European Examination Report for Application No. 15 188 089.5; dated May 24, 2017.

* cited by examiner

APPARATUS AND METHOD FOR ANALYZING A CONTROL NETWORK

BACKGROUND OF THE INVENTION

The present invention relates to control networks, and in particular, to systems and methods for analyzing control networks.

Industrial controllers, such as Programmable Logic Controllers (PLC's), are specialized electronic computer systems used for the control of industrial processes or machinery, for example, in a factory environment. Industrial controllers differ from conventional computers in a number of ways. Physically, they are constructed to be substantially more robust against shock and damage and to better resist external contaminants and extreme environmental conditions. The processors and operating systems are optimized for real-time control and execute languages allowing ready customization of programs to comport with a variety of different controller applications. Industrial controllers may have a user interface for accessing, controlling and/or monitoring the industrial controller, such as through a locally or remotely connected terminal(s) having a keyboard, mouse and display.

Typically, industrial controllers have a highly modular architecture that allows different numbers and types of network cards or adapters to be used to connect the controllers to the process or machinery to be controlled through special. "control networks" suitable for highly reliable and available real-time communication. Such control networks commonly used in industrial control systems include, for example, ControlNet, DeviceNet, EtherNet/IP and Sercos, whose specifications are published and whose protocols are used broadly by a number of manufacturers and suppliers. Control networks differ from standard communication networks, such as Ethernet, by guaranteeing maximum communication delays. This may be obtained, for example, by pre-scheduling the bandwidth of the network and/or providing redundant communication capabilities to high-availability. Control networks also differ from one another in physical aspects, for example, the type of media (e.g., co-axial cable, twisted pair, light fiber, wireless communications, etc.), the protocols of its operation, (e.g., Baud rate, number of channels, word transmission size, use of connected messaging, solicited and unsolicited messaging, etc.) and how the data is formatted and how it is collected into standard messages.

As part of their enhanced modularity, industrial controllers may employ one or more industrial devices coupled through the control networks. Industrial devices may comprise one or more I/O modules, AC/DC drives, motion drives or other hardware devices dedicated to a particular type of industrial function, for example, detecting input AC or DC signals or controlling output AC or DC signals in conjunction with an industrial process, or running motors or other machinery. Each I/O module or drive may have a connector system allowing them to be installed in different combinations in an industrial device along with other selected I/O modules or drives to match the demands of the particular application. Multiple industrial devices may be located at convenient control points near the controlled process or machine to communicate with the industrial controller via the control network.

Industrial controllers and/or industrial devices may be added, removed and/or updated periodically throughout a factory environment. For example, a new industrial process may be added via a new industrial device to increase the capability or the capacity of the industrial system. Similarly, an existing industrial controller and/or industrial device in an industrial system may be modified to include updated hardware or updated firmware. In some applications, industrial controllers and/or industrial devices must also be added, removed and/or updated while the industrial system is actively running. This may occur, for example, when interrupting the process would cause costly downtime and/or product defects. Consequently, the industrial system may typically change over time and throughout physically dispersed areas throughout the operating geography or in the factory.

U.S. patent application Ser. No. 13/528,198, titled "Industrial Hardware installation Base Reporting and Failure Monitoring," assigned to the present assignee and incorporated herein by reference in its entirety, discloses an apparatus and method for automatically retrieving installation information for devices in a network. Here, installation information for a system, including device name, hardware area location including node number or IP address, serial number, manufacturing date, product type, device code, hardware description, firmware revision, major and minor fault flag, slot number and important condition monitoring parameters, may be automatically found in the system.

What is needed is an improved system for analyzing control networks with maximum speed and minimum intrusiveness. Moreover, what is needed is a technique for accurately determining resource utilization for control networks in order to provide diagnostic and reliability (DR) services.

SUMMARY OF THE INVENTION

The present inventors have recognized that by isolating and applying a common protocol which may be used by multiple devices across multiple network levels, a more rapid and less intrusive analysis of an entire system of control networks may be provided. A generic, unsolicited message may be sent individually to targeted addresses across a network level. If a response is received from a device at a targeted address, such as within a timeout period, a specific message customized to the individual device may be sent to extract further detail about the device, including its connectivity to other devices and networks. The system may continue automatically until all devices on the network have been interrogated and the resource utilization of the entire system is determined to thereby provide diagnostic and reliability services.

Common Industrial Protocol (CIP) is a media independent industrial protocol for industrial automation applications supported by the Open DeviceNet Vendors Association (ODVA). CIP is described in "The Common Industrial Protocol (CIP) and the Family of CIP Networks," Copyright 2006, Open DeviceNet Vendor Association, Inc., which document is incorporated herein by reference in its entirety.

CIP encompasses a comprehensive suite of messages and services for the collection of manufacturing automation applications, including control, safety, synchronization, motion, configuration and other information. Application extensions to CIP include CIP Safety, providing a communication between nodes such as safety I/O blocks, safety interlock switches, safety light curtains and safety PLCs in safety applications up to Safety Integrity Level (SIL) 3 according to IBC 61508 standards. CIP Motion, allowing integration of field devices and motion drives on the same network thereby eliminating the need for a separate motion optimized network, and CIP Sync, a time synchronization extension to CIP based on the recent IEEE-1588 standard—Precision Clock Synchronization Protocol for Networked Measurement and Control Systems—providing increased control coordination for sequencing demanding events recording, distributed motion control and other distributed applications. CIP maximizes compatibility among devices in an industrial system, and typical control networks implementing CIP include EtherNet/IP, DeviceNet, ControlNet and similar networks whose specifications are published and whose protocols are used broadly by a number of manufacturers and suppliers.

CIP explicit messages contain addressing and service information that directs a receiving device to perform a certain service (action) on a specific part (e.g., an attribute) of a device. A generic CIP explicit message, such as a Logix5000 programmed "RSWho" message, may be sent individually to targeted addresses in a network to seek device type information. If no response is received with a timeout period, the system may simply move on to the next address. However, if a response is received identifying a device type, such as, for example, a CIP identity object identifying an attribute, then a library may be consulted to send a second message specific to the device type to extract maximum detail from the device, including attributes for Vendor ID, Device Type, Product Code, Revision, Status, Serial Number, Product Name, State, Configuration Consistency Value, Heartbeat Interval, and/or Languages Supported, as well as hardware area location including node number or IP address, manufacturing date, product type, device code, hardware description, firmware revision, serial number, major and minor fault flag, slot number and important condition monitoring parameters, and so forth.

Accordingly, data may be collected and stored within a data structure to enable direct interrogation of any connected devices. Such interrogation can occur on-demand.

Specifically then, the present invention, in one embodiment, provides a module for analyzing an industrial control network comprising: a library data structure relating messages to a plurality of device types; a communication interface for communicating with a device in the control network; and an electronic processor executing a program stored in a non-transitory computer-readable storage medium. The processor may execute to: (a) send a first communication to a target location in the control network via the communication interface, wherein the first communication includes a message configured to be processed by any of the device types, and wherein the first communication directs a device to provide information for identifying its device type; (b) receive a response via the communication interface from a device at the target location, wherein the response provides information identifying its device type; and (c) send a second communication to the device via the communication interface, wherein the second communication includes a message configured to be processed by a subset of the device types that includes the identified device type, and wherein the second communication directs the device to provide a data value or range of data values.

The present invention, in another embodiment, provides a method of analyzing an industrial control network using a library data structure relating messages to a plurality of device types. The method may comprise: (a) sending a first communication to a target location in a control network via a communication interface, wherein the first communication includes a message configured to be processed by any of the device types, and wherein the first communication directs a device to provide information for identifying its device type, (b) receiving a response via the communication interface from a device at the target location, wherein the response provides information identifying its device type; and (c) sending a second communication to the device via the communication interface, wherein the second communication includes a message configured to be processed by a subset of the device types which includes the identified device type, and wherein the second communication directs the device to provide a data value.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Figure 1:
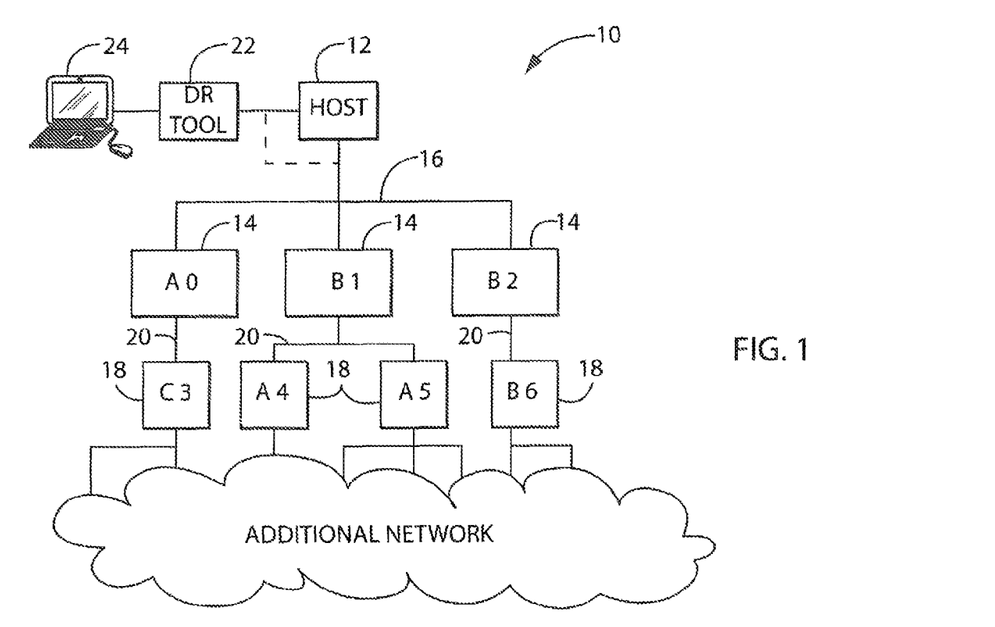
FIG. 1 is a simplified diagram of a control network system in accordance with an embodiment of the present invention.

Referring now to FIG. 1, a simplified diagram of an exemplar control network system. 10 is provided in accordance with an embodiment of the present invention. The system 10 may comprise a host device 12 connected to one or more first level devices 14 via a first level network 16. Each of the first level devices 14 may, in turn, connect to one or more second level devices 18 via one or more second level networks 20. Similarly, each of the second level devices 18 may, in turn, connect to one or more third level devices via one or more third level networks, and so forth (additional network). Accordingly, the control network system 10 may expand to a vast number of network devices via multiple network levels.

The network devices, including the host device 12, the first level devices 14 and the second level devices 18, may each be network compatible devices, such as Programmable Logic Controllers (PLC's) or other industrial controllers or devices. The network devices may implement a control network protocol, such as ControlNet. DeviceNet, EtherNet/

IP or SERCOS. Accordingly, the network levels, including the first level network 16, the second level networks 20, and so forth, could each be control networks, such as Control-Net, DeviceNet, EtherNet/IP or SERCOS network types.

Moreover, the differing network levels may implement different network types. For example, the first level network 16 may implement an EtherNet/IP network, whereas the second level networks 20 (and beyond) may variously implement ControlNet, DeviceNet or SERCOS networks. In embodiments, one or more of the network devices on the various network levels may be used to control processes and/or machinery in automation environments, such as by controlling industrial devices which control sensors and actuators, including as described in U.S. patent application Ser. No. 13/528,198, titled "Industrial Hardware Installation Base Reporting And Failure Monitoring," incorporated herein by reference in its entirety.

Although the network levels may differ by network types, the network levels may nevertheless implement a common protocol between them at a higher level of abstraction, such as Common Industrial Protocol (CIP), as described in "The Common Industrial Protocol (CIP) and the Family of CIP Networks," Copyright 2006, Open DeviceNet Vendor Association, Inc., which document is incorporated herein by reference in its entirety. Accordingly, the common protocol may be used to communicate between network devices on different network levels, which may also be of different network types.

A diagnostic and reliability (DR) tool 22 may be used for automatically analyzing and determining resources of the system 10 and provide diagnostic and reliability services accordingly. The DR tool 22 may be coupled to the control network system 10 via the host device 12, or alternatively, via the first level network 16. If coupled to the host device 12, the DR tool 22 may send and receive communications through the host device 12. Alternatively, if coupled to the first level network 16, the DR tool 22 may send and receive communications with other network devices as another network device in the system.

In embodiments, the DR tool 22 may be implemented as a PLC or other industrial controller or device. In addition, the DR tool 22 may be coupled to a Database/Database Transaction Manager and Human Machine Interface (HMI) 24 providing, for example, a monitor, keyboard, mouse and/or other wired or wireless I/O functionality as known in the art. The Database/Database Transaction Manager may be operable to receive raw data and process or convert such data for network analysis. In embodiments, the Database/Database Transaction Manager may be integrated with, or distributed among, the DR Tool 22, the HMI 24 and/or other wired or wirelessly connected hardware. For example, a transaction manager and data logger element may be integrated within the HMI 22 with a database in a separate host device. Alternatively, the DR Tool 22 could include a transaction manager and data logger with a database in a separate host device. Alternatively, multiple DR Tools 22, or processing elements thereof, could each include transaction managers and data loggers transferring data into a common database, which common database could be in a separate host device. Accordingly, it will be appreciated that a variety of distributed computing options may be available without departing from the spirit of the invention.

In operation, the DR tool 22 may send, such as via the host device 12, a first communication to a target location in the first level network 16. Target locations may be based on a possible range of Internet Protocol (IP) addresses, node addresses, Media Access Control (MAC) addresses, and/or other addressing scheme, and could begin with the lowest possible address, incrementing toward the highest possible address. The first communication may include a generic message configured to be processed by multiple device types, such as device types "A," "B" or "C." The first communication may direct a device, if present at a target location, to provide information for identifying its particular device type. To conserve bandwidth in the system 10, the first communication may be a CIP explicit message or a unicast message with only one receiver at one target location. If no response is received within a predetermined timeout period, such as thirty (30) seconds, the DR tool 22 may simply send a first communication to a next address (or first communication to a next series of addresses). If a response is received from a device at the target location, such as within the timeout period, the DR tool 22 may reference a library to send a specific message customized to the identified individual device to extract greater detail about the device, including its connectivity to other devices and networks. Accordingly, the second communication may include a message configured to be processed by a subset of the device types that includes the identified device type.

For example, at a particular target location or address, after sending a first (generic) communication, the DR tool 22 may receive a response from a first level device 14 on the first level network 16 identifying itself as a device type "A," illustrated as instance "A0." The DR tool 22 may then generate a tag based on the device type and reference a library data structure relating messages to a device types, then send a second (specific) communication to the first level device 14 that includes a message configured to be processed by a subset of the device types that includes the identified device type A. The second communication is designed to extract more detailed information about the network device. Moreover, a CIP Connection ID may be established upon receipt of a response to the first communication, and the second communication may be sent using the CIP Connection ID. The DR tool 22 may then continue its analysis of the first level network 16, perhaps finding an identified device type "B" at another target location or address, illustrated as instance "B1," and then another device type B at yet another target location or address, illustrated as instance "B2."

After identifying all of the first level devices 14 on the first level network 16, and upon extracting detail about the first level devices 14 via data values from the first level devices 14, the DR tool 22 may systematically proceed to the second level networks 20, sequentially or in parallel. For Example, the DR tool 22 may proceed sequentially, beginning with the second level network 20 connected to the network device A0. In doing so, the DR tool 22 may send a third (generic) communication to a target location in the second level network 20, via the network device A0, and await a response, similarly as described with respect to the first level network 16. Accordingly, the DR tool 22 may find a second level device 18, identified as a device type "C," at a target location or address, illustrated as instance "C3," which may be the only network device connected to the network device A0. The DR tool may then send a fourth (specific) communication to extract detail about the network device C3, then may proceed to other second level networks 20, and may find, for example, network devices instances "A4" and "A5" connected to the network device B1, and network device instance "B6" connected to the network device B2. The DR tool 22 may then continue in this fashion to explore third level networks, fourth level networks, and so forth, until the entire system 10 is analyzed and determined.

Alternatively, the DR tool 22 may examine multiple network levels simultaneously, or in parallel. The DR tool 22 may also periodically re-analyze the system 10 and/or monitor the system 10 for predetermined fault conditions.

Figure 2:
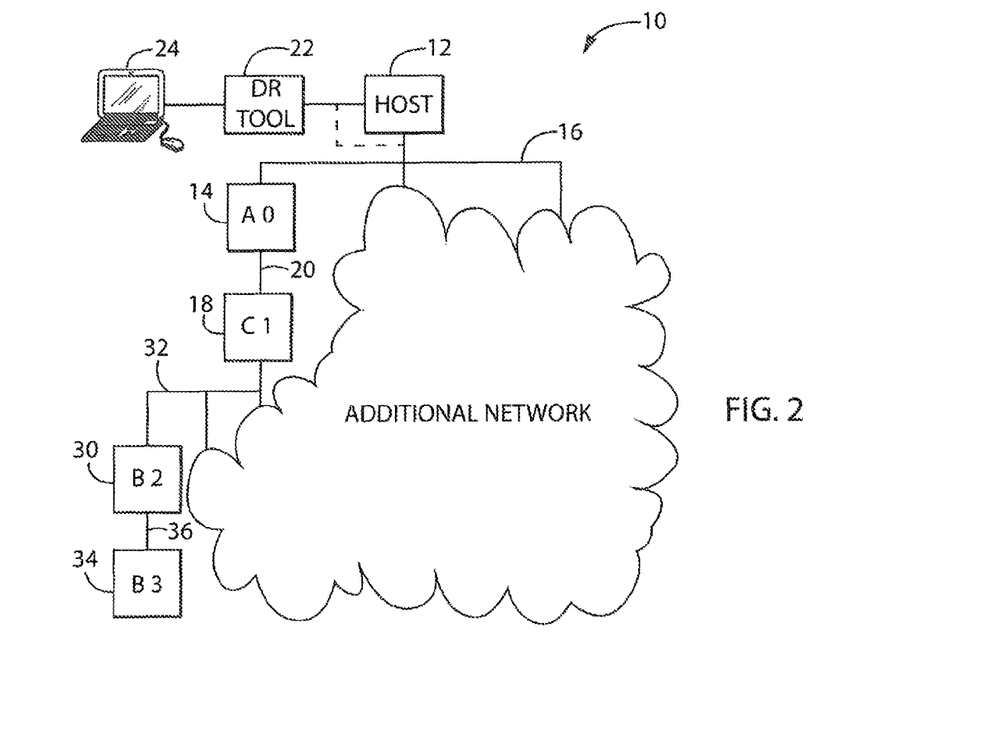
FIG. 2 is a simplified diagram of a control network system in accordance with another embodiment of the present invention.

It will be appreciated that the DR tool 22 may analyze and determine various network levels and devices in various sequences and orders at various times. For example, in another embodiment as illustrated in FIG. 2, upon initially analyzing the network device A0 at the first level network 16, and determining the presence of the second level network 20 connected to the network device A0, the DR tool 22 may immediately proceed to analyze the second level network 20 via the network device A0. Accordingly, the DR tool 22 may initially find the second level device 18, illustrated as instance "C1," and may determine the presence of a third level network 32 connected to the network device C1. Accordingly, the DR tool 22 may immediately proceed to analyze the third level network 32 via the network device C1, initially finding a third level device 30, illustrated, as instance "B2", and the presence of a fourth level network 36 connected to the network device B2. The DR tool may immediately proceed to analyze fourth level network 36, and so forth, until the path is fully determined, before returning to proceed along different paths.

Figure 3:
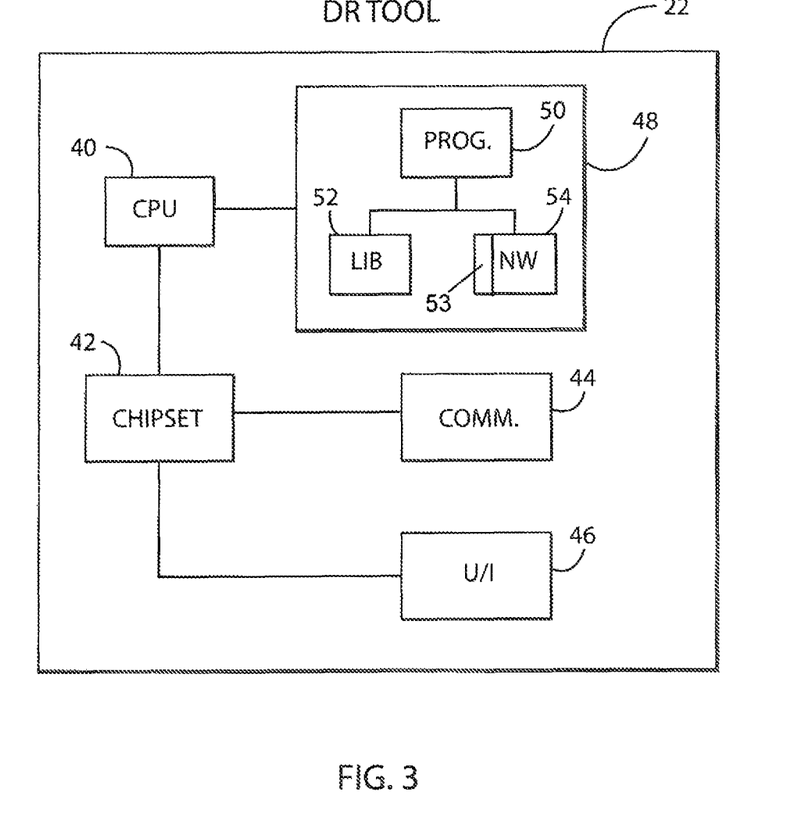
FIG. 3 is a simplified diagram of diagnostic and reliability tool for analyzing a control network system in accordance with an embodiment of the present invention.

Referring now to FIG. 3, a simplified diagram of the DR tool 22 for analyzing the system 10 is provided in accordance with an embodiment of the present invention. The DR tool 22 may comprise a Central Processing Unit (CPU) 40 or other processing element or controller in communication with a chipset 42 for interfacing to a communication interface 44 and an optional user interface 46. Alternative embodiments may provide various levels of integration of the CPU 40, the chipset 42, the communication interface 44 and the user interface 46, such as a single microcontroller, Programmable Logic Device (PLD) or other logic element, or distributed semiconductor components. In a preferred embodiment, the DR tool 22 may be a PLC.

The communication interface 44 may implement one or more control network protocols, such as ControlNet, DeviceNet, EtherNet/IP and/or SERCOS, for communicating with the first level network 16. The user interface 46 may implement the same protocol as the communication interface 44, or a different wired or wireless network protocol which may be suitable for communicating with the HMI 24.

The CPU 40 is also in communication with a non-transitory computer-readable storage medium 48, which may be a system memory such as DRAM or Flash memory. The storage medium 48 holds a program 50 for executing the logic of the DR tool 22. The storage medium 48 also holds a library data structure 52, a database transaction manager/data logger 53 and a network data structure 54. The library data structure 52 and the network data structure 54 may be local relational databases in communication with the program 50. The database transaction manager/data logger 53 may be operable to receive raw data and process or convert such data for network analysis via the network data structure 54. In alternative embodiments, it will be appreciated that a variety of distributed computing options may be available for providing the program 50, the library data structure 52, the database transaction manager/data logger 53 and/or the network data structure 54, including as described above with respect to FIG. 1, without departing from the spirit of the invention.

Figure 4:
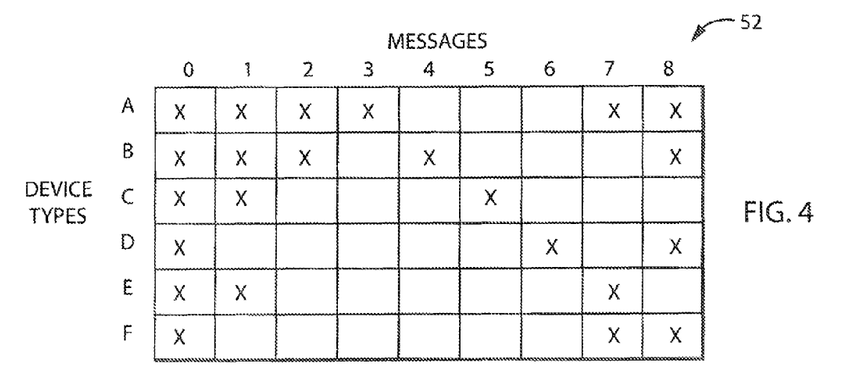
FIG. 4 is a simplified diagram of library data structure used by the diagnostic and reliability tool of FIG. 3.

Referring now to FIG. 4, a simplified diagram of the library data structure 52 used by the DR tool 22 is provided in accordance with an embodiment of the invention. The library data structure 52 relates a plurality of device types, such as device types "A," "B," "C," and so forth, to a plurality of messages, such as message "0," "1," "2," and so forth. As illustrated in FIG. 4, a corresponding "X" indicates whether a message may be configured to be processed by a particular device type. For example, message 0 may be configured to be processed by every device type, whereas message 5 may be configured to be processed only by device type C. Accordingly, some messages may be configured to be processed by a subset of device types, such as message 2, which may be processed by device types A and B, but no others.

Message 0 being configured to be processed by every device type may indicate message 0 as being a generic message. In a CIP compatible system, message 0 may be a generic CIP explicit message containing addressing and service information that directs a receiving device to provide information for identifying a device type, such as an identifying CIP attribute The CIP explicit message could direct a network device to provide a CIP identity object attribute comprising one or more of a Vendor ID, Device Type, Product Code, Revision, Status, Serial Number, Product Name, State, Configuration Consistency Value, Heartbeat Interval, and/or Languages Supported. For example, message could be a Logix5000 programmed RSWho message. Generic messages, such as message 0, may be optimal for first communications to target locations (point to point) to direct devices to provide information for identifying a device type.

Alternatively, message 5 being configured to be processed only by device type C may indicate message 5 as being a specific message. In a CIP compatible system, message 0 may be an Add-On Instruction created specifically for devices corresponding to device type C, which may be implemented, for example, in ladder logic code. Add-On Instructions are described, for example, in "Logix5000 Controllers Add-On Instructions," Rockwell Automation Publication 1756-PM010E-EN-P, September 20012, which document is incorporated herein by reference in its entirety. Accordingly, the library data structure 52 may relate Add-On Instructions to CIP device types. Other examples may be messages that could direct a network device to provide a hardware area location including node number or IP address, manufacturing date, product type, device code, hardware description, firmware revision, serial number, major and minor fault flag, slot number and important condition monitoring parameters. Specific messages may also be used to find communication devices connecting to additional network levels. Specific messages, such as message 5, may be optimal for second communications to target locations to direct identified devices to provide information for identifying a device type.

Figure 5:
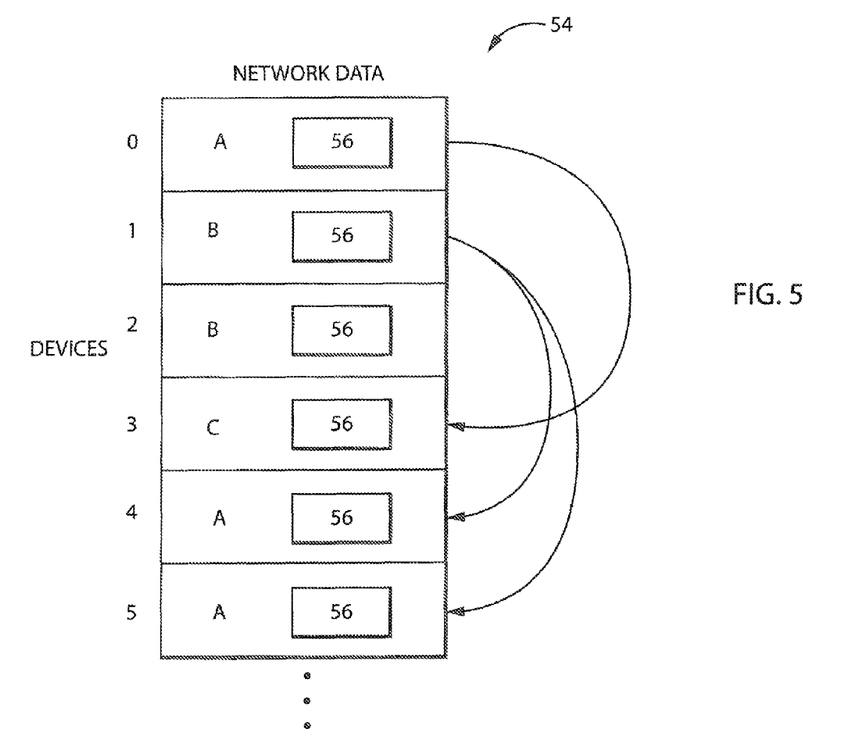
FIG. 5 is a simplified diagram of network data structure used by the diagnostic and reliability tool of FIG. 3.

Referring now to FIG. 5, a simplified diagram of network data structure 54 used by the DR tool 22 is provided in accordance with an embodiment of the invention. Upon receiving a response from a network device, such as in response to the first (generic) communication, an instance number, such as "0," "1," "2." and so forth may be allocated, and each instance may identify a corresponding device type, such as "A," "B" "C," and so forth. For example, instance number 0 may identify device type A. In addition, a response may generate a tag based on the device type which may be used in a second (specific) communication.

Next, upon receiving an additional data value from the network device, such as in response to the second (specific) communication, each instance may be updated to identify a corresponding data value 56. For example, the data value 56 may identify for a particular network device a hardware area location including node number or IP address, manufacturing date, product type, device code, hardware description, firmware revision, serial number, major and minor fault flag, slot number and important condition monitoring parameters. Instances of the network data structure 54 may also be updated to link downstream network devices together. For Example, instance 0 (A0) may link instance 3 (A3) as a downstream network device on next network level as described above with respect to FIG. 1. The data value 56 may also store tags used by the network device, which may then be used by another message for the same or another network device.

Figure 6:
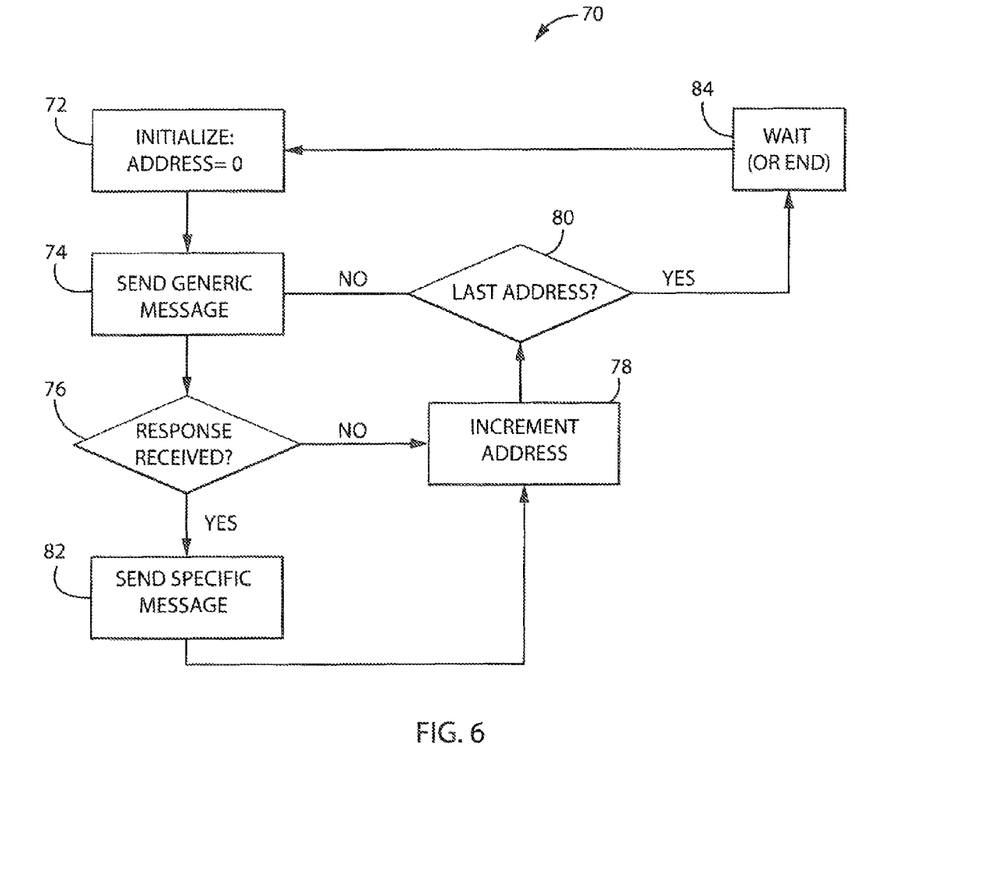
FIG. 6 is a simplified flow diagram of process for analyzing a control network system in accordance with an embodiment of the present invention.

Referring now to FIG. 6, a simplified flow diagram of process 70 for analyzing a control network system is provided in accordance with an embodiment of the present invention. In block 72, the program 50 initializes to the first possible address for the first possible network device at a particular network level, which may be the lowest possible address. An IP address may be used, for example, in systems adhering to Internet Protocol for communication, though alternative addressing schemes, such as node addressing and/or MAC addressing, may also be used. Next, in block 74, the program 50 instructs the processor in the DR Tool 22 to send a first (generic) communication to a particular target location or address. A CIP explicit message, such as RSWho, may be used, for example, in systems adhering to CIP.

In block 76, the program 50, through the DR tool 22, looks for a response from the first communication. If no response is received, the target location is then incremented in block 78, and the program 50 then determines whether the last possible address has been reached in block 80. If the last possible address has not been reached, the program 50 returns to block 74 and again executes to cause the DR Tool 22 to send a first (generic) communication to the next particular target location or address. This loop continues until either a response is received in block 76 or the last possible address is reached in block 80.

If a response is received in block 76, such as from the first level devices 14 over the first level network 16, the program 50 executes in block 82 to instruct the processor in the DR tool 22 to reference a library data structure and send a second (specific) communication that includes a message configured to be processed by a subset of the device types that includes the identified device type. The second communication instructs the network device to provide a data value, such as the data value 56. In addition, the program 50 builds, continues to build and/or updates the network data structure 54 comprising the retrieved information.

Alternatively, if the last possible address is reached in block 80, the program 50 then ends in block 84 having completed an analysis of the network level. The program 50 may wait for a predetermined amount of time then repeat the analysis of the industrial system by returning to block 72. As such, industrial controllers and/or industrial devices added, removed and/or updated periodically throughout the industrial automation environment may be captured. Alternatively, the program 50 may wait to repeat the analysis of the industrial automation environment until directed by a user via the HMI 24.

The process 70 may be repeated at various network levels to analyze a control network system in different ways, including as described above with respect to FIGS. 1 and 2. For example, referring now to FIG. 7 and a simplified flow diagram of process 88, in process in block 90, the program 50 may initialize a network level to zero, thereby reflecting an analysis of a first level network. Next, in block 92, the program 50 initializes to the first possible address for the first possible network device at a particular network level, which may be the lowest possible address. Next, in block 94, the DR Tool 22 sends a first (generic) communication to a particular target location or address, A CIP explicit message, such as RSWho, may be used, for example, in systems adhering to CIP.

Figure 7:
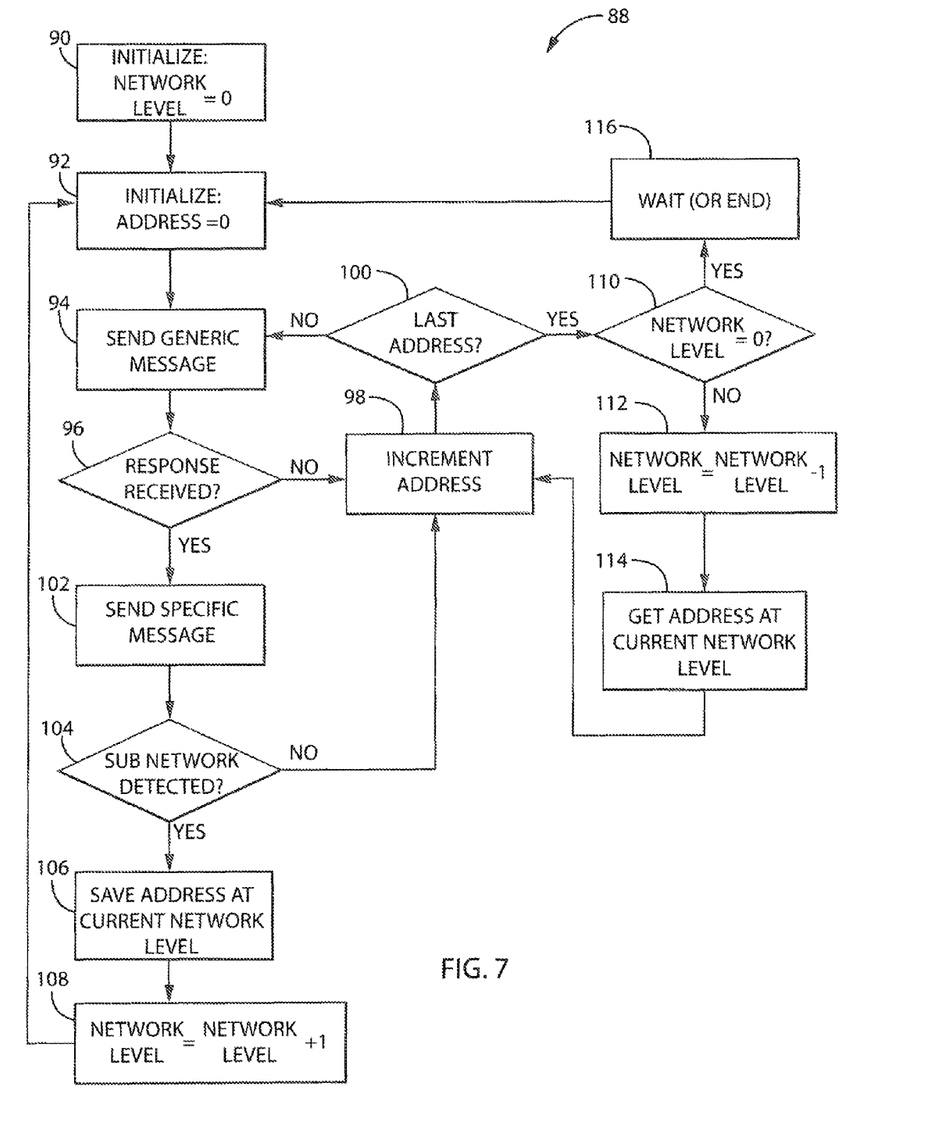
FIG. 7 is a simplified flow diagram of process for analyzing a control network system across multiple network levels in accordance with another embodiment of the present invention.

In block 96, the DR tool 22 looks for a response from the first communication. If no response is received, the target location is then incremented in block 98, and the program 50 then determines whether the last possible address has been reached in block 100. If the last possible address has not been reached, the program 50 returns to block 94 and again executes to cause the DR Tool 22 to send a first (generic) communication to the next particular target location or address. This loop continues until either a response is received in block 96 or the last possible address is reached in block 100.

If a response is received in block 96, the program 50 may execute in block 102 to instruct the processor in the DR tool 22 to reference a library data structure and send a second (specific) communication that includes a message configured to be processed by a subset of the device types that includes the identified device type. The second communication instructs the network device to provide a data value, such as the data value 56. In addition, the program 50 builds, continues to build and/or updates the network data structure 54 comprising the retrieved information.

Next, in block 104, the program 50 determines whether an additional level network is present. If an additional network level is found to be present, in block 106, the program 50 can save the current network level and current address, and in block 108, may increment the network level by one. The program 50 then returns, for example, to block 92 to initialize to the first possible address for the first possible hardware device at the current network level, and continues to a first (generic) communication to a target address or location until either a response is received in block 96 or the last possible address is reached in block 100, similar to that described above.

If the last possible address is reached in block 100, the program 50 then determines whether the network level is zero in block 110. If the network level is non-zero, as is the case when analyzing an additional network level, the program 50, having now analyzed the additional network level, decrements the network level by one in block 112 and retrieves the previously saved address at the current network level in block 114. The program 50 then returns to block 98 to increment the address level and again determine whether the last possible address has been reached in block 100. Thus, the program 50 may iteratively analyze networks and sub-networks at multiple levels.

If the last possible address is reached in block 100, and the network level is determined to be zero in block 110, thereby indicating the first level network having been analyzed, the program 50 then ends in block 116 having completed an analysis of the control network system. The program 50 may wait for a predetermined amount of time then repeat the analysis of the system by returning to block 92. As such, industrial controllers and/or industrial devices added, removed and/or updated periodically throughout the industrial automation environment may be captured. Alternatively, the program 50 may wait to repeat the analysis of the industrial automation environment until directed by a user via the HMI 24.

The DR tool 22 could also be implemented to monitor for hardware failures and for condition monitoring, including as described with respect to FIGS. 5 and 7 of U.S. patent application Ser. No. 13/528,198, titled "Industrial Hardware Installation Base Reporting and Failure Monitoring," incorporated herein by reference.

Certain terminology is used herein for purposes of reference only, and thus is not intended to be limiting. Such terminology may include the words specifically mentioned above, derivatives thereof, and words of similar import. For example, the terms "first," "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor," and "a processor" or "a CPU" can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A system for analyzing a control network comprising:
   a library data structure relating messages to a plurality of device types;
   a communication interface for communicating with a first level device in a first level control network; and
   an electronic processor executing a program stored in a non-transitory computer-readable storage medium to:
   (a) send a first communication to a target location in the first level control network via the communication interface, wherein the first communication includes a message configured to be processed by any of the device types, and wherein the first communication directs a first level device to provide information for identifying its device type;
   (b) receive a response via the communication interface from the first level device at the target location, wherein the response provides information identifying its device type; and
   (c) send a second communication to the first level device via the communication interface,
   wherein, based on the library data structure, the second communication includes a message specific to the identified device type and configured to be processed by a subset of the device types that includes the identified device type, and
   wherein the second communication including the message specific to the identified device type directs the first level device to provide a data value identifying a connection by the first level device for communicating with a second level device in a second level control network;
   (d) send a third communication to a target location in the second level control network, wherein the third communication is sent via the first level device,
   wherein the third communication is configured to be processed by any of the device types, and wherein the third communication directs a second level device in the second level control network to provide information for identifying its device type; and
   (e) sending a fourth communication to the second level device, wherein the fourth communication includes a message configured to be processed by a subset of the device types which includes the identified device type for the second level device.

2. The system of claim 1, wherein the first level control network is a ControlNet, DeviceNet, EtherNet/IP or SERCOS network type, and the second level control network is a control network type different than the first level network.

3. The system of claim 1, wherein the first communication is a unicast message.

4. The system of claim 1, wherein the first communication is a CIP explicit message.

5. The system of claim 4, wherein a CIP Connection ID is established upon receipt of the response and the second communication is sent using the CIP Connection ID.

6. The system of claim 4, wherein the information identifying the device type corresponds to a CIP identity object attribute comprising at least one of a vendor ID, a device type, a product code, a serial number and a product name.

7. The system of claim 4, wherein the library data structure relates Add-On Instructions to CIP device types.

8. The system of claim 6, wherein the second communication comprises an Add-On Instruction specific to the identified device type.

9. The system of claim 1, wherein the target location corresponds to at least one of an IP address, a node address and a MAC address.

10. The system of claim 9, wherein the information identifying the device type is stored as a tag in a local database.

11. The system of claim 1, wherein the second communication further directs the first level device to provide at least one of a physical location, a firmware revision number, a serial number, a node number, a slot number and a fault flag.

12. The system of claim 1, wherein the system is a Programmable Logic Controller (PLC).

13. A method of analyzing a control network using a library data structure relating messages to a plurality of device types, the method comprising:
   (a) sending a first communication to a target location in a control network via a communication interface, wherein the first communication includes a message configured to be processed by any of the device types, and wherein the first communication directs a first level device to provide information for identifying its device type;

(b) receiving a response via the communication interface from the first level device at the target location, wherein the response provides information identifying its device type;

(c) sending a second communication to the first level device via the communication interface, wherein, based on the library data structure, the second communication includes a message specific to the identified device type and configured to be processed by a subset of the device types which includes the identified device type, and wherein the second communication including the message specific to the identified device type directs the first level device to provide a data value identifying a connection by the first level device for communicating with a second level device in a second level control network;

(d) sending a third communication to a target location in the second level control network, wherein the third communication is sent via the first level device, wherein the third communication is configured to be processed by any of the device types, and wherein the third communication directs a second level device in the second level control network to provide information for identifying its device type; and (e) sending a fourth communication to the second level device, wherein the fourth communication includes a message configured to be processed by a subset of the device types which includes the identified device type for the second level device.

14. The method of claim 13, further comprising sending an Add-On Instruction specific to the identified device type as part of the second communication.

15. The method of claim 13, further comprising establishing a CIP Connection ID and sending the second communication via the CIP Connection ID.

* * * * *